US006866611B2

(12) United States Patent
Tsuzuki et al.

(10) Patent No.: US 6,866,611 B2
(45) Date of Patent: Mar. 15, 2005

(54) VEHICLE RANGE SHIFT MECHANISM

(75) Inventors: Shigeo Tsuzuki, Anjo (JP); Jiro Maeda, Anjo (JP); Naoki Ohkoshi, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/606,121

(22) Filed: Jun. 26, 2003

(65) Prior Publication Data

US 2004/0053743 A1 Mar. 18, 2004

(30) Foreign Application Priority Data

Jul. 16, 2002 (JP) .......................... 2002-207527

(51) Int. Cl.[7] .............................................. F16H 59/62
(52) U.S. Cl. ........................ 477/97; 477/46; 477/159; 477/160; 477/906; 74/335; 74/336 R; 74/473.21; 74/473.12; 475/119; 475/127; 475/132; 475/133
(58) Field of Search ........................... 477/97, 906, 46, 477/160, 159; 74/335, 336 R, 473.21, 473.12; 475/119, 127, 132, 133

(56) References Cited

U.S. PATENT DOCUMENTS

| 5,092,198 | A | * | 3/1992 | Morishige et al. ............ 477/46 |
| 5,505,674 | A | * | 4/1996 | Furukawa et al. .......... 477/130 |
| 5,601,510 | A | * | 2/1997 | Sakakiyama et al. ......... 477/96 |
| 5,901,608 | A | * | 5/1999 | Takeyama .................... 74/335 |
| 6,499,371 | B2 | * | 12/2002 | Tsuzuki et al. ............... 74/335 |
| 6,589,133 | B2 | * | 7/2003 | Kusafuka et al. ............. 477/97 |

FOREIGN PATENT DOCUMENTS

| JP | 07-190180 | | 7/1995 |
| WO | WO 01/42687 A1 | * | 6/2001 |

* cited by examiner

Primary Examiner—Charles A. Marmor
Assistant Examiner—David D. Le
(74) Attorney, Agent, or Firm—Lorusso, Loud & Kelly

(57) ABSTRACT

A judging section judges whether or not ranges detected, respectively, by a first range detection section consisting of a first detection section and a position detecting sensor, and a second range detection section consisting of a second detection section; a C1 detecting sensor and a B1 detecting sensor are in mutual agreement, and when the detected ranges are not in mutual agreement, a failure judging section judges a failure of the first range detection section.

9 Claims, 10 Drawing Sheets

VEHICLE RANGE SHIFT MECHANISM

The disclosure of Japanese Patent Application No. 2002-207527 filed on Jul. 16, 2002, including the specification, drawings and abstract, is incorporated herein by reference in its entirety.

CROSS-REFERENCE TO RELATED APPLICATIONS

This application claims, under 35 USC 119, priority of Japanese Application No.2002-207527 filed on Jul. 16, 2002.

BACKGROUND OF THE INVENTION

1. Field of the Invention

The present invention relates to a range shift mechanism mounted in a vehicle or the like, and in particular, to a range shift mechanism (so-called shift-by-wire) interlocked with the operation of a range selecting mechanism, such as a shift lever, and controls, for example, a hydraulic control unit, to change over a shift range.

2. Related Art

A range shifter mechanism that changes the shift range of an automatic transmission conventionally includes a manual valve within a transmission and a shift lever provided in the passenger compartment and connected to the manual valve via a shift cable. The manual valve is positioned via the shift cable according to the operation of the shift lever by a driver.

In recent years flexibility in the location of the shift lever has become increasingly needed to respond to demands for increasing the degree of freedom in vehicle cabin design and in expanding derivative vehicle types from identical platforms. However, the shift cable which connects the shift lever and the manual valve has many layout restrictions and, accordingly, development of a range shift mechanism that does not use such a shift cable has been needed.

A range shift mechanism in answer to the aforementioned demands is proposed, for example, in Japanese Patent Laid-Open Publication ("Kokai") No. 7-190180. The range shift mechanism disclosed in the Kokai 7-190190 includes an electric motor which transmits torque to a manual valve to operate the manual valve and thereby change the shift range. However, such a range shift mechanism may have difficulty in changing to a desired shift range due to, for example, failure of a position detecting sensor (position sensor) for detecting the target shift range, or difficulty in recognizing position with the sensor due to, for example, influences of noise or temperature.

In addition, the prior art range shift mechanism does not provide for situations such as fluctuations in the drive of the electric motor caused by large changes in ambient temperature. Fluctuations in the drive of the electric motor, in turn, translate into differences in the operating position of the manual valve, thereby causing difficulty in changing to the desired shift range.

SUMMARY OF THE INVENTION

It is an object of the present invention to provide a range shift mechanism wherein a failure in detection, such as by a position detecting sensor, can be reliably detected, thereby solving the problems described above.

It is another object of the present invention, in addition to achieving the above object, to provide a vehicle range shift mechanism which, upon encountering difficulty in changing over to a desired shift range, shifts to a safer state instead.

Accordingly, the present invention provides a vehicle range shift mechanism including a range selecting device for selecting a shift range (for example, P, R, N, D, or Ds range), a drive mechanism that is interlocked with and drives the range selecting device, a range shift controller that operates a changeover valve with the driving force of the drive mechanism to change the shift range (for example, P, R, N, D, and Ds range) of an automatic transmission, and a transmitting mechanism that transmits the driving force of the drive mechanism to the range shift controller.

More specifically, the vehicle range shift mechanism includes:

a first range detection section that detects a shift range corresponding to the operative position of the transmitting mechanism;

a second range detection section that detects a shift range (for example, P, R, N, D, and Ds range) newly established by the range operating mechanism;

a judging section that judges whether the results of the detection of the first and second range detectors are in mutual agreement; and a failure judging mechanism that judges a failure of the first range detection section when the detection results are judged by the judging mechanism as not in mutual agreement.

The vehicle range shift mechanism of the present invention reliably detects a failure of the position detecting sensor for detecting the changed over shift range because the failure judging section judges a failure of the first range detection section when it is judged that the detection result of the first range detection section, in which the shift range corresponding to the operating position of the transmitting mechanism is detected by the judging section, and the result of detection by the second range detection section, in which the actual changed over (newly established) shift range is detected, are not in mutual agreement; thus, it is possible to rapidly and appropriately implement countermeasures when a failure occurs.

The vehicle range shift mechanism according to the present invention may be applied to an automatic transmission provided with first and second friction engaging elements that respectively correspond to a forward range (for example, D or Ds range) and a reverse range (R range), and first and second hydraulic servos that respectively operate the first and second friction engaging elements. In this case the second range detection section is provided with first and second hydraulic pressure detecting sensors that respectively detect the presence of hydraulic pressure supplied to the first and second hydraulic servos, and a range judging section that judges the shift range (for example, P, R, N, D, and Ds range) of the automatic transmission based upon signals received from these hydraulic pressure detecting sensors. The range judging section judges that the shift range is a forward range (for example, D or Ds range) when the first hydraulic pressure detecting sensor detects hydraulic pressure supplied to the first hydraulic servo and the second hydraulic pressure detecting sensor detects supply of hydraulic pressure to the second hydraulic servo, judges that the shift range is a reverse range (for example, R range) when the first hydraulic pressure detecting sensor does not detect supply of hydraulic pressure to the first hydraulic servo and the second hydraulic pressure detecting sensor detects the supply of hydraulic pressure to the second hydraulic servo, and judges that the shift range is a non-traveling range (for example, P or N range) when neither of hydraulic pressure detecting sensors detects supply of hydraulic pressure.

The vehicle range shift mechanism has a simplified structure because the actual newly established shift range of the automatic transmission can be accurately detected simply by detecting the presence of hydraulic pressure supplied to the first and second hydraulic servos with the first and second detecting sensors, and judging the results of detection.

The second range detection section may be provided with first and second rotation detecting sensors that respectively detect the number of rotations of a rotating element on an input side and of a rotating element on the output side of the automatic transmission, and a range judging section that judges the shift range (for example, P, R, N, D, or Ds range) of the automatic transmission based upon signals received from these rotation detecting sensors.

The range judging section compares the detected number of rotations respectively detected by the first and second rotation detection sections and calculates a ratio thereof, judges that the shift range is a forward range (for example, D or Ds range) when the ratio is greater than 0, judges that the shift range is reverse (for example, R range) when the ratio is less than 0, and judges that the shift range is a non-traveling range (for example, P or N range) when the ratio is 0.

Thus, the structure of the vehicle range shift mechanism is further simplified because the range detection is simplified in that the actual newly established shift range of the automatic transmission can be accurately determined by simply calculating the ratio of the number of rotations of an output side rotation element, such as right and left axles, to the number of rotations of an input side rotation element, such as an input shaft, and judging the ratio with the range judging section.

The vehicle range shift mechanism according to the present invention may further include a controller that executes a preset fail-safe process when the failure judging section judges a failure.

With the vehicle range shift mechanism of the present invention where the detection result from the first range detection section, in which the shift range corresponding to the operating position of the transmitting mechanism is detected, and the detection result from the second range detection section, in which the actual changed over shift range is detected, are not in mutual agreement and the failure judging mechanism judges a failure of the first range detection section, that is, where a shift range different from the desired range was actually established, the transmission may be shifted to a safer state by the controller executing the preset fail-safe procedure. For example, if an alarm is generated as a sound or a light as a fail-safe procedure, when the desired shift range selected by the driver is not the same as the actual, newly established shift range, despite proper operation of the range selecting mechanism while traveling, the driver immediately recognizes that situation and can take appropriate action.

The vehicle range shift mechanism according to the present invention may further include a speed detecting sensor that detects vehicle traveling speed.

The controller may generate an alarm by the sounding of a buzzer and/or the lighting of a lamp while stopping the drive of the drive mechanism as a fail-safe process in a case where the failure judging section judges a failure when the second range detecting mechanism detects a traveling range (for example, D or Ds range) and the speed detection section detects a traveling speed equal to or greater than a predetermined value.

When the results of detection of the first and second range detection sections are not in mutual agreement and a failure of the first range detection section is judged, if a vehicle traveling speed equal to or greater than the predetermined value is detected, an alarm is generated in the form of the sounding of a buzzer or the lighting of a lamp while stopping the drive of the drive mechanism as a fail-safe procedure. Thus, even when changing to a desired shift range encounters difficulty during travel, the driver is immediately notified of the situation. Consequently, the driver can bring the vehicle to a stop on the side of the road by braking or take other appropriate action. In this case, the alarm from the buzzer and the lamp may be cancelled when, for example, the range selecting mechanism is returned to a neutral position.

The vehicle range shift mechanism of the present invention may further include a speed sensor that detects a vehicle traveling speed, in which case the controller changes the traveling range (for example, D or Ds range) to a parking range by operating the drive mechanism in one direction for a predetermined amount of time or longer as a fail-safe procedure, responsive to judgement of a failure by the failure judging section when the second range detection section detects a traveling range (for example, D or Ds range) and the speed detector detects a traveling speed that is less than a predetermined value.

Where the results of detection of both the first and second range detection sections are not in mutual agreement and a failure of the first range detection section is judged, if the detected vehicle traveling speed is less than the predetermined value, the drive mechanism may be driven in one direction for a predetermined period or longer to change from the traveling range to the parking range as a fail-safe procedure. Therefore, even when a shift change encounters difficulty, the shift range can be reliably and automatically changed to the parking range in stopping or the like, thereby achieving a safe state.

The vehicle range shift mechanism according to the first aspect of the present invention may further include a speed sensor that detects a vehicle traveling speed, in an embodiment wherein the controller generates an alarm by the sounding of a buzzer and/or the lighting of a lamp while stopping the drive mechanism as a fail-safe procedure and where the failure judging section judges a failure when the second range detection section detects a traveling range and the speed sensor detects a traveling speed that is less than a predetermined value.

In another embodiment when the outputs of the first and second range detection sections are not in agreement and a failure of the first range detection section is judged, if the detected vehicle traveling speed is less than the predetermined value, an alarm is generated by the sounding of a buzzer or the lighting of a lamp while stopping the drive mechanism. Thus, even when a change to a desired shift range encounters difficulty during stopping or the like, the driver can be immediately notified of that situation. In this case, the alarm can be cancelled when, for example, the range selecting mechanism is returned to the neutral position.

DETAILED DESCRIPTION OF THE PREFERRED EMBODIMENTS

First Embodiment

Figure 1:
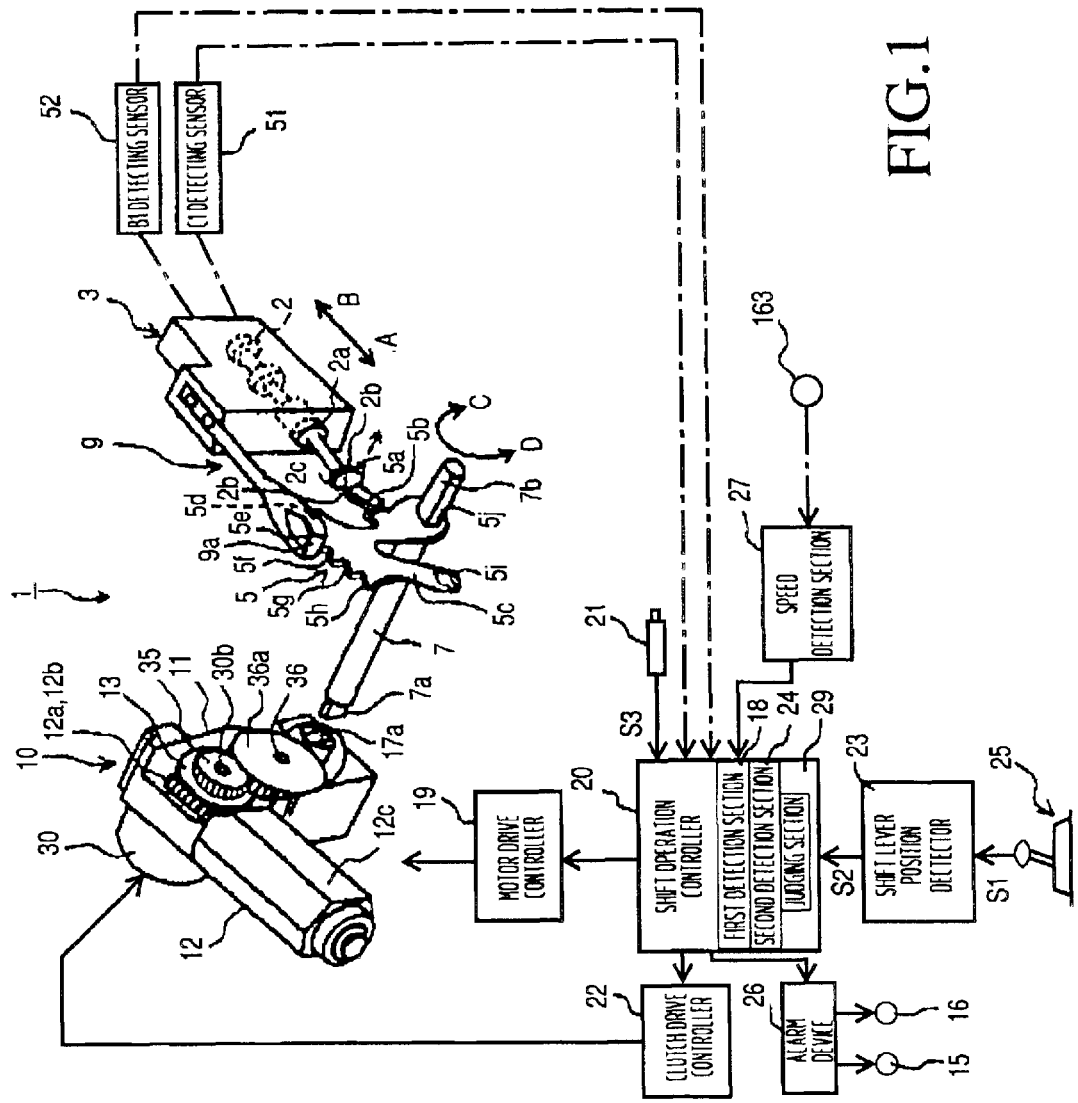
FIG. 1 is a perspective view of a range shift mechanism of a first embodiment of the present invention.

A first embodiment of the present invention will now be described with reference to FIG. 1 and FIG. 2. The range shift mechanism has a manual valve 2, which is utilized in, for example, a multistage automatic transmission (not shown) and a continuously variable transmission (CVT) (not shown).

The manual valve 2 is housed in a valve body 3 which forms a portion of a cover 8 (see FIG. 2) of an automatic transmission 101 (see FIG. 4); mounted in a vehicle. The manual valve 2 is movable in the directions of arrows. A and B, along the axis of a spool 2a of the valve, within the valve body 3. The automatic transmission 101 provides for shifting through the ranges P, R, N, D, and Ds, in succession, from the arrow A side toward the arrow B side in the figure, by moving the manual valve 2 in either the direction of arrow A or B. In addition, an engaging groove 2c defined at the periphery of two circular plates 2b is provided at an end of the manual valve 2 on the arrow A side. A detent lever 5 engages the engaging groove 2c via a pin 5a extending from an arm portion 5b of the detent lever 5 (see FIG. 3).

Figure 3:
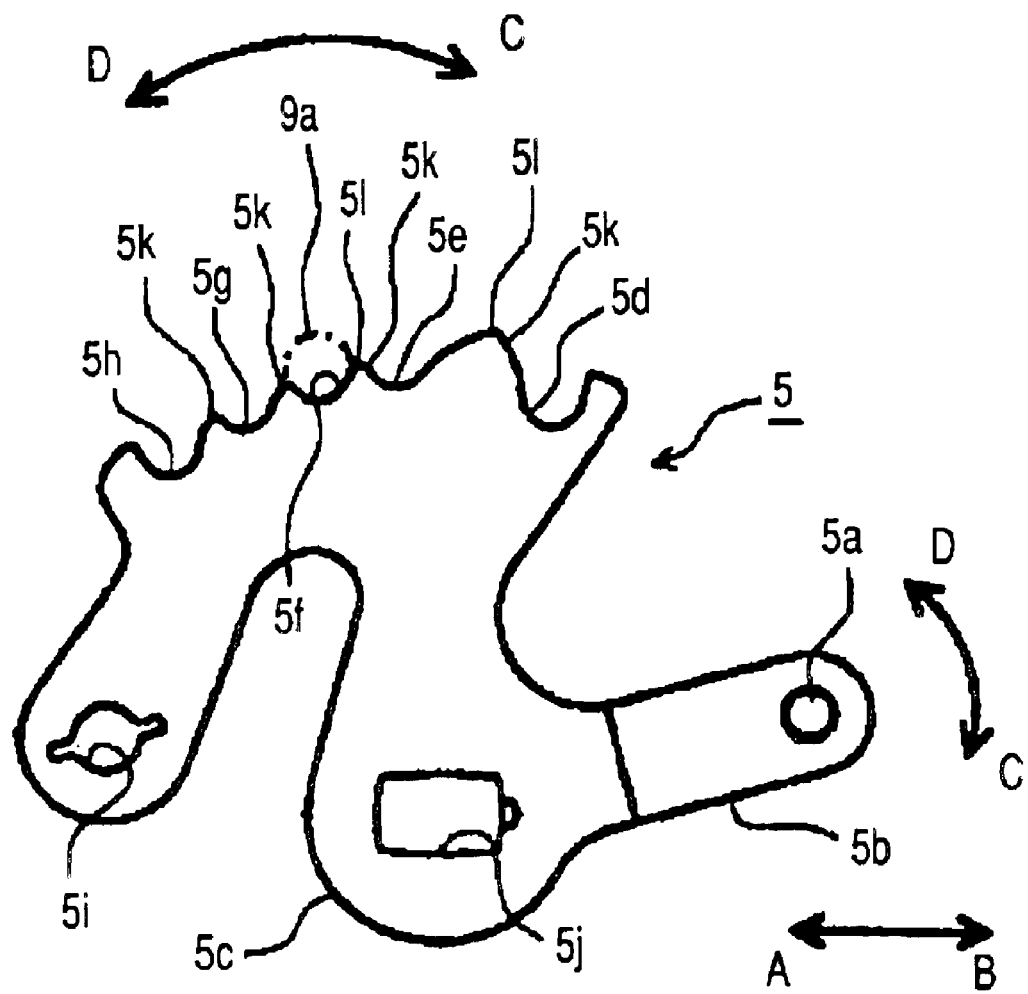
FIG. 3 is a plan view of a detent lever in the range shift mechanism of the first embodiment shown in FIG. 1.

FIG. 3 shows the detent lever 5 in more detail. As shown in FIG. 3, the detent lever 5 has a plate-shaped body 5c. Five range engagement grooves 5d, 5e, 5f, 5g, and 5h are formed at predetermined intervals on an upper portion of the body 5c and the range engagement grooves 5d, 5e, 5f, 5g, and 5h are arranged in order from right to left in the figure in a configuration corresponding to the "P", "R, "N", "D", and "Ds" ranges of the automatic transmission. In addition, the arm portion 5b which carries the pin 5a protrudes rightward in the figure from the body 5c. A parking rod engaging hole 5i for engaging a parking rod of a parking mechanism in P range extends through a left portion of the body 5c. Furthermore, an oblong engaging hole 5j, in which a range control shaft 7 is inserted, is formed at substantially the center of the body 5c.

Further, as shown in FIG. 1, a detent spring 9, in the form of a leaf spring having an end thereof fixed to the valve body 3, a casing of the automatic transmission or the like, is biased downward in the figure by its own elasticity and has a roller 9a rotatably supported on its distal end which is engaged by insertion into any one of the five range engagement grooves 5d, 5e, 5f, 5g, and 5h. Furthermore, the range control shaft 7 in the shape of a pole engages the detent lever 5 by insertion in the engaging hole 5j of the body 5c.

An engaging protrusion 7a with an oblong cross section extends from the left end portion of the range control shaft left in FIG. 1, and a valve driving device 10 is connected to the engaging protrusion 7a. The valve driving device 10, as shown in FIG. 2, is attached to the cover 8 of the automatic transmission via a bolt 28. The valve driving device 10, as shown in FIGS. 1 and 2, is formed in a box shape, and has a casing 11 to which an electric motor 12 is attached. A worm 12b is attached to an output shaft 12a of the electric motor 12. The casing 11 is supported between a rotor 32 and a worm wheel 13 by a supporting plate 45, and attached to the cover 8 of the automatic transmission.

Figure 2:
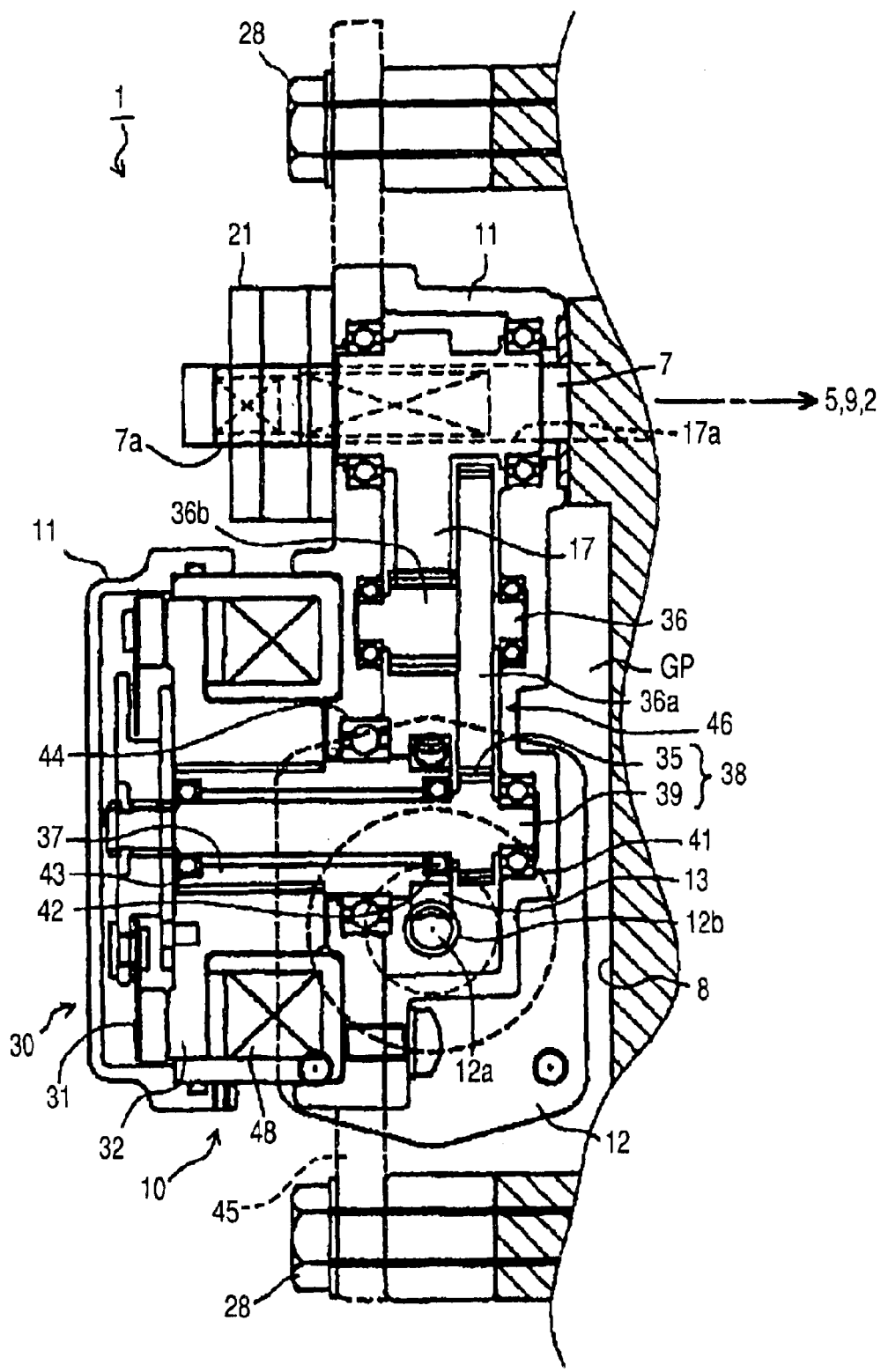
FIG. 2 is a front elevation of a drive portion of the range shift mechanism.

The worm wheel 13 is meshed with the worm 12b and attached to an input shaft 37 of an electromagnetic clutch 30 which, in turn, is attached to the left hand side of the casing 11 in FIG. 2. The input shaft 37 has a cylindrical shape, and the rotor 32, part of the electromagnetic clutch 30, is in splined engagement with a left end of the input shaft 37 in FIG. 2. An exciting coil 48 is provided in an outer peripheral portion of the rotor 32.

In addition, a power input shaft 38 of a deceleration gear mechanism 46 (described later) is rotatably supported, concentric with and nested within the input shaft 37. The power input shaft 38 is formed as a connecting shaft 39 with a small gear 35 provided on one end thereof. The one end of the connecting shaft 39 is supported by the casing 11 via a bearing 41, and its opposite end is supported by the input shaft 37 via bearings 42 and 43. The bearing 42 is provided in a position axially overlapping the worm wheel 13.

Also, a disc 31 is connected to a left end of the power input shaft 38 of the deceleration gear mechanism 46 in opposition to the rotor 32. The disc 31 is engaged by and released from the rotor 32 by magnetization and demagnetization, i.e., by energization and deenergization of the exciting coil 48. The valve driving device 10 including the electromagnetic clutch 30, as shown in FIG. 2, is arranged to form a gap GP with respect to the cover 8 of the automatic transmission, to ameliorate the problem of heat generated by the automatic transmission being transferred from the cover 8.

The small gear 35 is provided on the connecting shaft 39 of the power input shaft 38, and a large gear 36a of an intermediate shaft 36 rotatably supported by the casing 11 meshes with the small gear 35. Furthermore, a small gear 36b is formed on the intermediate shaft 36 and is meshed with a fan-shaped output gear 17 rotatably supported in the casing 11. The oblong engaging hole 17a is bored into a center portion of the output gear 17 (see FIG. 1) and the engaging protrusion 7a of the range control shaft 7 is inserted therein.

The electric motor 12 serves as the "drive mechanism" and the gear column including the small gear 35 of the electromagnetic clutch 30, which forms the "deceleration gear mechanism", the large gear 36a and the small gear 36b of the intermediate shaft 36, and the output gear 17 are aligned vertically in the figure so that the output shaft 30b is nested within and concentric with the input shaft 37 of the electromagnetic clutch 30, and thus, the input shaft 37 and the output shaft 30b extend outward in the same direction.

The manual valve 2, a hydraulic control unit 3, the detent lever 5, the detent spring 9, in combination, form a "range operating mechanism". A "transmitting mechanism" is formed by the combination of the range control shaft 7, the electromagnetic clutch 30, the deceleration gear mechanism 46, and the like.

Next, the control unit of the present embodiment will be described. As shown in FIG. 1, the control unit includes a shift operation controller 20, a position sensor 21 which sends various signals to the shift operation controller 20, a C1 detecting sensor 51, a B1 detecting sensor 52, a speed detection section 27, and a shift lever position detector 23. The control unit further includes a motor drive control mechanism 19 which receives command signals from the shift operation controller 20, a clutch drive control mechanism 22, and an alarm device 26. A buzzer 15 and a lamp 16, that generate alarms during execution of a fail-safe procedure to be described later, are connected to the alarm device 26.

The shift lever position detector 23 detects the position (shift position) of a shift lever 25 (or shift switch, etc.), which is a range selecting mechanism for selecting a shift range (P, R, N, D, or Ds range), and outputs a range selection signal to the shift operation controller 20. In addition the speed detection section 27 detects the rotation of a secondary shaft. 127 (see FIG. 4), which is a rotational element on the output side of the automatic transmission 101, based upon a rotation detecting signal from an electromagnetic pick-up 163 (see FIG. 4) to be described later.

The sensor body of the position detecting sensor 21, as shown in FIG. 2, is fixed to the casing 11, and meshes with the engaging protrusion 7a of the range control shaft 7 supported for rotation relative to the sensor body. The position detecting sensor 21 detects the rotational position of the range control shaft 7, and accordingly, the rotational position of the detent lever 5, and outputs a signal to a first detection section 18 of the shift operation controller 20.

The automatic transmission 101 has a direct clutch (a first friction engaging element) C1 and a reverse brake (a second friction engaging element) B1 corresponding to a forward range, such as D and Ds range, and R range (reverse range), respectively, and a hydraulic servo (a first hydraulic servo) C1 and a hydraulic servo (a second hydraulic servo) B1' which respectively operate the direct clutch C1 and the reverse brake B1. The direct clutch C1 is a forward range element that is always engaged in the D and Ds ranges, and the reverse brake B1 is a reverse range element that becomes engaged upon shifting to the R range. Neither the direct clutch C1 nor the reverse brake B1 are engaged in a non-traveling range, i.e., P (parking), or N (neutral).

The C1 detecting sensor 51 is a first hydraulic sensor that detects the presence of hydraulic pressure supplied to the hydraulic servo C1' which operates the direct clutch C1. The B1 detecting sensor 52 is a second hydraulic sensor that detects the presence of hydraulic pressure supplied to the hydraulic servo B1' (see FIG. 5) which operates the reverse brake B1.

The shift operation controller 20 includes the first detection section 18, a second detection section 24, and a judging section 29. The shift operation controller 20 receives signals from the position detecting sensor 21, the C1 detecting sensor 51, the B1 detecting sensor 52, the speed detection section 27, and the like and respectively outputs corresponding commands to the motor driving controller 19, the clutch driving controller 22, and the alarm device 26.

The first detection section 18 detects the shift range corresponding to the operating position of the transmitting mechanism based upon the signal received from the position detector 21. Therefore, the "first range detecting means" includes the position detecting sensor 21 and the first detection section 18. The second detection section 24 detects the shift range to which the automatic transmission 101 is actually shifted by the range operating mechanism. Therefore, the "second range detection section" includes both detecting sensors 51 and 52 and the second detection section 24. The judging section 29 judges whether the results of detection of the first and second range detection sections are in mutual agreement, and a failure judging section judges a failure of the first range detection section if it is judged by the judging section that the results of detection are not in mutual agreement.

The second range detection section detects the actual range upon completion of the shift in the following manner. When the C1 detecting sensor 51 detects hydraulic pressure supplied to the hydraulic servo C1', and the B1 detecting sensor 52 does not detect hydraulic pressure supplied to the hydraulic servo B1', the direct clutch C1 corresponding to a forward range is in an engaged state and, therefore, the second range detection section judges that the new shift range is a forward range such as D range or Ds range.

When the C1 detecting sensor 51 does not detect hydraulic pressure supplied to the hydraulic servo C1', and the B1 detecting sensor 52 detects hydraulic pressure supplied to the hydraulic servo B1', the reverse brake B1 corresponding to a reverse range is in an engaged state and, therefore, the second range detection section judges that the new shift range is the R (reverse) range. Furthermore, when neither of the hydraulic pressure detecting sensors 51 and 52 detects supply of hydraulic pressure, neither the direct clutch C1 nor the reverse brake B1 is engaged and, therefore, the second range detection section judges that the shift range is a non-traveling range such as P or N range.

The shift operation controller 20 outputs various signals to the motor driving control mechanism 19, to the clutch driving control mechanism 22, and to the alarm device 26 to execute a fail-safe procedure for shifting to a safer state when the judging section 29 judges that the results of detection of the first and second range detection sections are not in mutual agreement and therefore judges a failure of the first range detection section, even where the shift range corresponding to the detected operating position of the transmitting mechanism is different from the actual detected shift range newly established.

The motor drive controller 19 controls the rotational drive of the electric motor 12 in response to a command from the shift operation controller 20, and the clutch drive controller 22 controls the operation of the electromagnetic clutch 30 in response to a command from the shift operation controller 20. In addition, the alarm device 26 alerts the driver by at least sounding the buzzer 15 provided within the vehicle or lighting a lamp 16 (turning on or off) also provided within the vehicle, in response to a command from the shift operation controller 20.

Thus, the control means that executes the fail-safe procedure so that the vehicle is shifted to a safer state when the judging section 29 judges that the foregoing results of detection are not in mutual agreement includes the shift operation controller 20, the motor drive controller 19, the clutch drive controller 22, and the alarm device 26.

In the fail-safe procedure, when the second range detection section detects a traveling range such as D or Ds range and the speed detection section 27 detects that the traveling speed is equal to or greater than a predetermined value (for example, 7 km/h), when the judging section 29 judges that the foregoing results of detection are not in agreement and that a failure has occurred in the first range detection section, the executing mechanism executes a process to sound the buzzer 15 and/or light the lamp 16 while stopping the drive of the electric motor 12. Also, when the second range detection section detects a traveling range and the speed detection section 27 detects that the traveling speed is less than a predetermined value (for example, 7 km/h) and the judging section 29 judges the results of detection not to be in agreement and judges a failure in the first range detection section, the executing mechanism executes a process that shifts to the P range by driving the electric motor 12 in one direction for at least a predetermined time or longer as a fail-safe procedure.

Alternatively, instead of the above fail-safe procedure, when the second range detection section detects a traveling range and the speed detection section 27 detects that the traveling speed is less than a predetermined value (for example, 7 km/h), if the judging section 29 judges that the results of detection are not in agreement and that a failure has occurred in the first range detection section, the buzzer 15 is sounded and/or the lamp 16 is lighted while stopping the drive of the electric motor 12.

Figure 4:
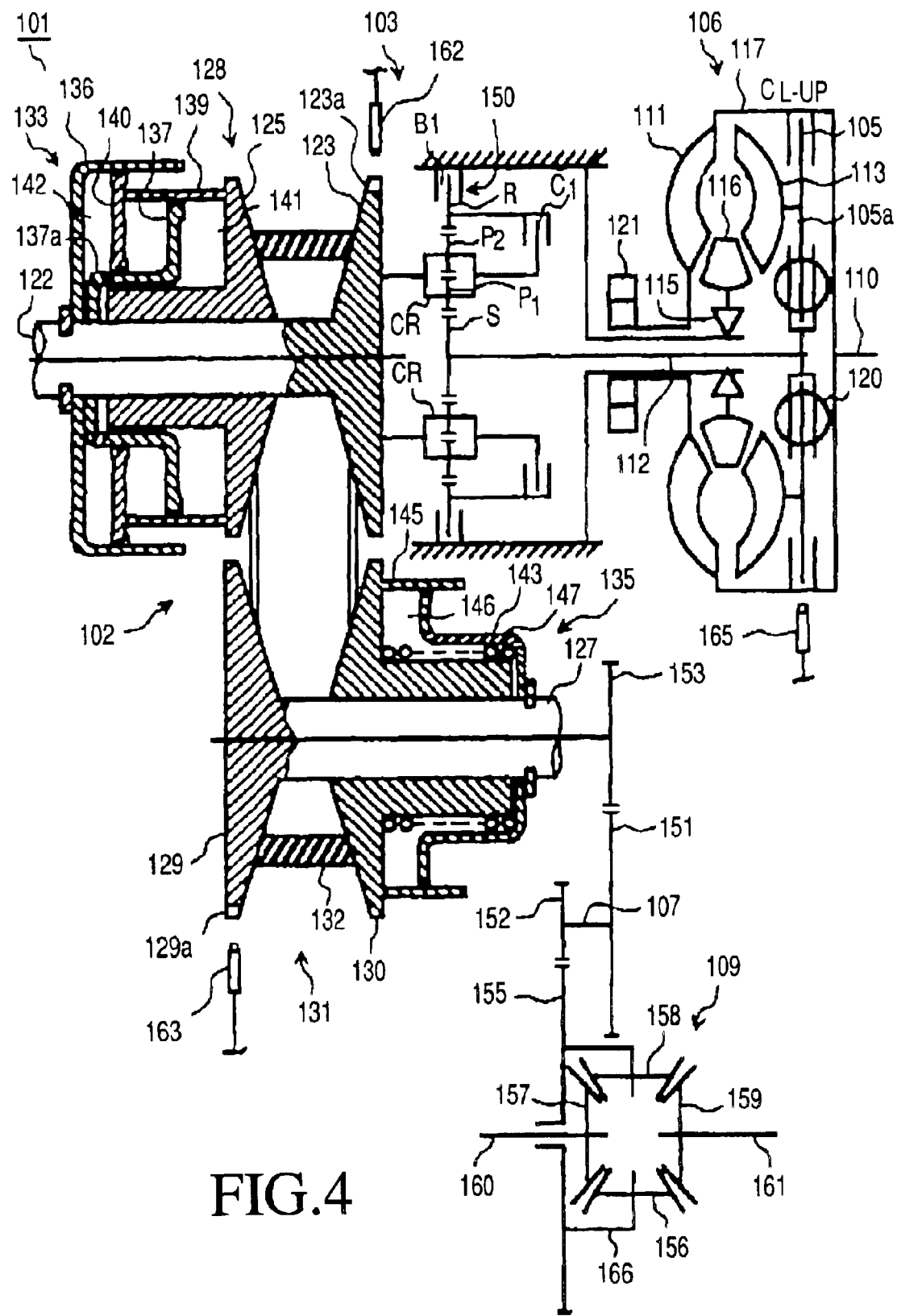
FIG. 4 is a schematic view of an example of a belt type continuously variable transmission as an example of an automatic transmission to which the range shift mechanism of the present invention may be applied.
Figure 5:
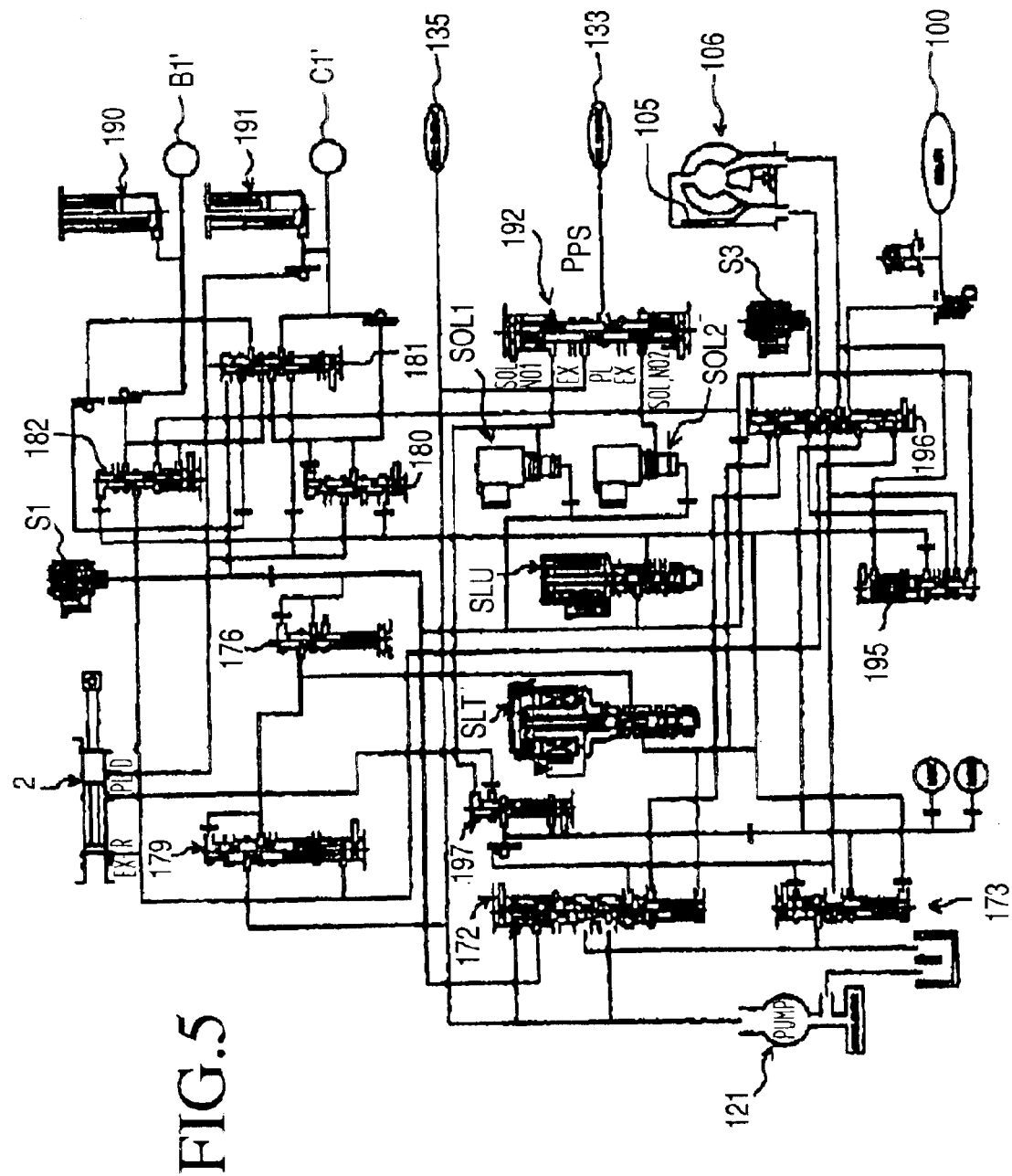
FIG. 5 is a diagram of a hydraulic circuit for controlling the automatic transmission in FIG. 4.

Next, the automatic transmission 101 in which the present range shift mechanism 1 is mounted will be described with reference to FIGS. 4 and 5. As shown in FIG. 4, the automatic transmission 101 includes a belt type continuously variable transmission (CVT) 102, a forward/reverse changeover device 103, a torque converter 106 having a lock-up clutch 105, a countershaft 107, and a differential device 109, all of which are housed in a segmented case (not shown).

The torque converter 106 has a pump impeller 111 connected to an engine output shaft 110 via a front cover 117, a turbine runner 113 connected to an input shaft 112, and a stator 116 supported via a one-way clutch 115. The lock-up clutch 105 is interposed between the input shaft 112 and the front cover 117. Also, a damper spring 120 is interposed between a lock-up clutch plate 105a and the input shaft 112, and an oil pump 121 is connected to the pump impeller 111.

The CVT 102 has a fixed sheave 123 fixed to a primary shaft 122, and a primary pulley 126 consisting of a movable sheave 125 which moves axially on and is freely supported by the primary shaft 122. A secondary pulley 13 includes a fixed sheave 129 fixed to a secondary shaft 127 serving as the output shaft of the automatic transmission 101, a movable sheave 130 which slides axially on the secondary shaft 127, and a metal belt 132 that is wound around the primary pulley 126 and the secondary pulley 131.

A double piston hydraulic actuator 133 is provided at the rear of the movable sheave 125 on the primary side, and a single piston hydraulic actuator 135 is provided at the rear of the movable sheave 130 on the secondary side. The hydraulic actuator 133 on the primary side has a cylindrical member 136 and a reaction force support member 137 fixed on the primary shaft 122, and a cylindrical skirt 139 and a piston member 140 fixed on the movable sheave 125. A first hydraulic chamber 141 is formed by the cylindrical skirt 139, the reaction force support member 137, and the movable sheave 125, and a second hydraulic chamber 142 is formed between the cylindrical member 136 and the piston member 140.

These first and second hydraulic chambers 141 and 142 generate an axial force which is generally double the axial force generated in the hydraulic actuator 135 on the secondary side with identical hydraulic pressure due to communication between first and second hydraulic chambers 131 and 142 through a linking hole 137a. The hydraulic actuator 135 on the secondary side has a reaction force support member 143 fixed to the secondary shaft 127, and a cylindrical skirt 145 fixed to the rear of the movable sheave 130, with a single hydraulic chamber 146 defined between the reaction force support member 143 and the cylindrical skirt 145. A spring 147 applying a preload is provided compressed between the movable sheave 130 and the reaction force support member 143.

The forward/reverse changeover device 103 has a double pinion planetary gear unit 150, a reverse brake B1 and a direct clutch C1. In the double pinion planetary gear 150, a sun gear S is connected with the input shaft 112, a carrier CR supporting a first pinion P1 and a second pinion P2 is connected to the fixed sheave 123 on the primary side, and a ring gear R is connected to the reverse brake B1. The direct clutch C1 is interposed between the carrier CR and the ring gear R.

A large gear 151 and a small gear 152 are fixed to the counter shaft 107. The large gear 151 meshes with a gear 153 fixed to the secondary shaft 127, and the small gear 152 meshes with a gear 155 of the differential device 109. In the differential device 109, the rotation of a differential gear 156 supported by a differential case 166, driven by the gear 155, is transmitted to right and left axles 160 and 161 via right and left side gears 157 and 159.

Notches 123a are formed at equal intervals by gear cutting of the outer periphery of the fixed sheave 123 on the primary side. Also, an electromagnetic pick-up 162 is fixed to a case (not shown) facing notches 123a. Likewise, multiple notches 129a are formed at equal intervals by gear cutting of the outer periphery of the fixed sheave 129 on the secondary side. Likewise, an electromagnetic pick-up 163 is fixed to the case and positioned to face these notches 129a. The electromagnetic pick-up 162 serves as a primary (input) rotational speed sensor and the electromagnetic pick-up 163 serves as a secondary (output) rotational speed sensor that detects the concave and convex portions 129a, namely, the electromagnetic pick-ups 162 and 163 output signals to the speed detection section 27 described earlier. Furthermore, an electromagnetic pick-up 165 is provided adjacent the front cover 117, and serves as an engine speed sensor.

Next, the hydraulic control circuit for the automatic transmission 101 will be described with reference to FIG. 5. FIG. 5 shows the hydraulic control circuit as including oil pump 121 described earlier, a primary regulator valve 172, a secondary regulator valve 173, a modulator valve 176 for a solenoid, a linear solenoid valve SLT for line pressure control, and a linear solenoid valve SLU for lock-up clutch control and forward/reverse hydraulic pressure control.

The hydraulic circuit has a manual valve 2 which, through manual operation, switches modulator pressure as regulated by a clutch modulator valve 179, between multiple ports. Furthermore, the hydraulic circuit has a C1 control valve 180, a relay valve 181, a B1 control valve 182, and a solenoid valve S1 for switching pressure control. It further includes the hydraulic servo C1 for the direct clutch C1, the hydraulic servo B1' for the reverse brake B1, a B1 accumulator 190 and a C1 accumulator 191. Although omitted from FIG. 5, the hydraulic control circuit further includes the C1 detecting sensor 51 and the B1 detecting sensor 52 (see FIG. 1) that detect the presence of hydraulic pressures respectively supplied to the hydraulic servos C1' and B1'.

In addition, the hydraulic circuit has a ratio control valve 192, solenoid valves SOL1 and SOL2 for up/downshifting of the ratio control valve 192, and the primary side hydraulic actuator 133 and the secondary side hydraulic actuator 135 described earlier. The hydraulic circuit further includes a lock-up control valve 195, a lock-up relay valve 196 combining gain switching, a solenoid valve S3 for lock-up switching, a drain port EX, and a cooler 100.

Next, the operation of the automatic transmission 101 and the hydraulic circuit will be described based upon FIGS. 4 and 5. Namely, when hydraulic pressure is generated by the oil pump 121 driven by engine rotation, the hydraulic pressure is regulated to a line pressure PL by the primary regulator valve 172 and further regulated to a secondary pressure Ps by the secondary regulator valve 173 under control of the linear solenoid valve SLT responsive to a signal based upon pulley ratio and input torque.

For example, in D range of the manual valve 2, hydraulic pressure from the port PL is supplied to the hydraulic servo C1' via the C1 control valve 180 and the relay valve 181, to engage the direct clutch C1. In this state, the rotation of the engine output shaft 110 is transmitted to the primary pulley 126 via the planetary gear unit 150 in a direct coupled state with the torque converter 106, the input shaft 112, and the direct clutch C1, and further transmitted to the secondary shaft 127, which is the output shaft of the automatic transmission 101, via the appropriately shifted CVT 102, and then transmitted to the right and left axles 160 and 161 via the differential device 109.

In addition, when the manual valve 2 is moved to the R range, the hydraulic pressure from the port PL is supplied to the hydraulic servo B1' via the B1 control valve 182 and the relay valve 181, engaging the reverse brake B1. In this state, the ring gear R of the planetary gear unit 150 is locked, and the rotation of the sun gear S from the input shaft 112 is taken up by the carrier CR as reverse rotation, and the reverse rotation is transmitted to the primary pulley 126.

The CVT 102 described earlier generates a belt holding force corresponding to input torque and the gear ratio, with line pressure PL from the primary regulator valve 172 supplied to the hydraulic actuator 135 of the secondary pulley 131. Meanwhile, the duty solenoid valves SOL1 and SOL2 are appropriately controlled responsive to a speed signal from a controller (not shown), the ratio control valve 192 is controlled by a signal pressure from the duty solenoids SOL1, and SOL2, the hydraulic pressure from an output port Pps thereof is supplied to the double piston hydraulic actuator 133 of the primary pulley 126, thus appropriately controlling the gear ratio of the CVT 102.

The torque of the engine output shaft 110 is transmitted to the input shaft 112 via the torque converter 106, particularly during starting, the torque ratio from the torque converter 106 being increased and transmitted to the input shaft 112 for a smooth start. The torque converter 106 has lock-up clutch 105 which, during high-speed stable travel, is engaged to directly couple the engine output shaft 110 and the input shaft 112, thereby eliminating a loss in power in transmission through the oil of the torque converter 106.

The range shift mechanism 1 operates as follows. Namely, while the vehicle is traveling or stopped, a shift signal S1 corresponding to the shift lever position (shift position) selected by manual operation of the driver is output as an electric signal from the shift lever 25 to the shift lever position detector 23. The shift lever position detector 23 calculates the shift position currently selected by the shift lever 25 in accordance with the shift signal S1, and outputs as a shift position signal S2 to the shift operation controller 20. The shift operation controller 20 judges a change in shift position by monitoring the shift position signal S2.

When it is judged that there is a change in the position of the shift lever 25, the shift operation controller 20 compares the shift position selected as a result of the change in shift lever position (hereinafter referred to as "target shift position") to the shift position previously selected by the shift lever 25 (hereinafter referred to as "current shift position"), and judges whether the electric motor 12 should be normally rotated to move the shift position from the current shift position to the target shift position.

Namely, the range positions of the manual valve 2, as shown in FIG. 1, are linearly set along the direction of arrows A and B and, therefore, it is necessary to judge whether the electric motor 12 needs to be rotated normally or in reverse, depending on the relationship between the current shift position and the target shift position. If changing the range in the P→R→N→D direction, for example, when changing from the R range to the D (drive) range by way of the N range, the shift operation controller 20 judges that the electric motor 12 is rotating normally, and if changing the shift range in the reverse D→N→R→P direction, for example when changing from the D range to the P range by way of the R range, it judges that the electric motor 12 is rotating in reverse.

The shift operation controller 20, commands the clutch driver controller 22 to connect the electromagnetic clutch 30, in addition to outputting a command to the motor drive controller 19 for rotating the electric motor 12 in the judged rotational direction.

In response to the above command, the clutch driver controller 22 magnetizes the exciting coil 48 of the electromagnetic clutch 30 to connect the disc 31 and the rotor 32, and the motor drive controller 19 drives the electric motor 12 to rotate in the previously judged direction. Thus, the rotation of the electric motor 12 is transmitted to the output gear 17 by way of the worm 12b, the worm wheel 13, the input shaft 37 of the electromagnetic clutch 30, the rotor 32, the disc 31, the power input shaft 38 of the deceleration gear mechanism 46, the small gear 35, the large gear 36a of the intermediate shaft 36, and the small gear 36b. The range control shaft 7 is driven through a predetermined rotational angle, with rotation in the direction of arrows C and D in FIG. 1.

Therefore, the detent lever 5 and the arm portion 5b also rotate through a predetermined angle in the direction of the arrows C and D, and the pin 5a rotates through a predetermined angle in the direction of the arrows C and D as well. As the pin 5a rotates, the position of the pin 5a in the direction of the arrows A and B in FIG. 3 changes corresponding to the rotational angle. Thus, the spool of the manual valve 2 engaged via the pin 5a and the engaging groove 2c also shifts in the direction of the arrows A and B an amount identical to the amount of shift of the pin 5a in the direction of the arrows A and B, therefore, the range of the manual valve 2 is changed in the order of P-R-N-D-Ds from the arrow A side in FIG. 1.

For example, when changing from the P range to the R range, the roller 9a of the detent spring 9, which is engaged within the range engaging groove 5d of the detent lever 5, rotated and driven in the direction of arrow C by the electric motor 12 via the range control shaft 7, as shown in FIG. 3, initiates movement vertically in the figure over a protrusion 5k, from the range engaging groove 5d toward the range engaging groove 5e and against the elasticity of the detent spring 9. Accompanying the rotation and driving of the electric motor 12, the roller 9a of the detent spring 9 completes a slight movement from a crown portion 51 of the protrusion 5k toward the range engaging groove 5e side.

The shift operation controller 20 constantly detects the rotational position of the detent lever 5 based upon the detection signal indicative of the rotational position of the range control shaft 7 sent from the position detecting sensor 21. The shift operation controller 20 can easily detect completion of a slight movement of the roller 9a of the detent spring 9 from a crown portion 51 of the protrusion 5k toward the range engaging groove 5e side based upon the signal of the position detecting sensor 21, because the position of the roller 9a of the detent spring 9 in the direction of the arrows C and D in FIG. 3 with respect to the detent lever 5 is constant.

When completion of slight movement of the roller 9a of the detent spring 9 from the crown portion 51 of the protrusion 5k toward the range engaging groove 5e side is detected, the shift operation controller 20 commands the clutch drive controller 22 to release the electromagnetic clutch 30, and commands the motor drive controller 19 to stop the electric motor 12. Receiving this command signal, the clutch drive controller 22 immediately cancels excitation and the magnetic force of the exciting coil 48 of the electromagnetic clutch 30, so that the driving force from the electric motor 12 is not transmitted to the input shaft 38 of the deceleration gear mechanism 46. Furthermore, the motor drive controller 19 stops the rotation and drive of the electric motor 12. Thus, the rotational force from the electric motor 12 is no longer transmitted to the output gear 17 side, and the drive mechanisms on the downward side of the disc 31 of the electromagnetic clutch 30, from the power input shaft 38 of the deceleration gear mechanism 46 to the intermediate shaft 36, output gear 17, and detent lever 5, are in a freely rotating state as long as no positioning operation is performed.

In this state, due to the roller 9a of the detent spring 9 being shifted upward in FIG. 1 against its elasticity, rotational momentum acts to rotate the detent lever 5 in the direction of the arrow C. When inserting the roller 9a of the detent spring 9 within the engaging groove 5e, the detent lever 5 rotates through a predetermined angle in the direction of arrow C. Moreover, when the roller 9a is inserted within the engaging groove 5e, the detent lever 5 becomes positioned and retained at the determined position, i.e. the R range position, by the detent spring 9. Also, when rotating the electric motor 12 in reverse to change the range in the D→N→R→P direction, an identical operation is performed.

Figure 6:
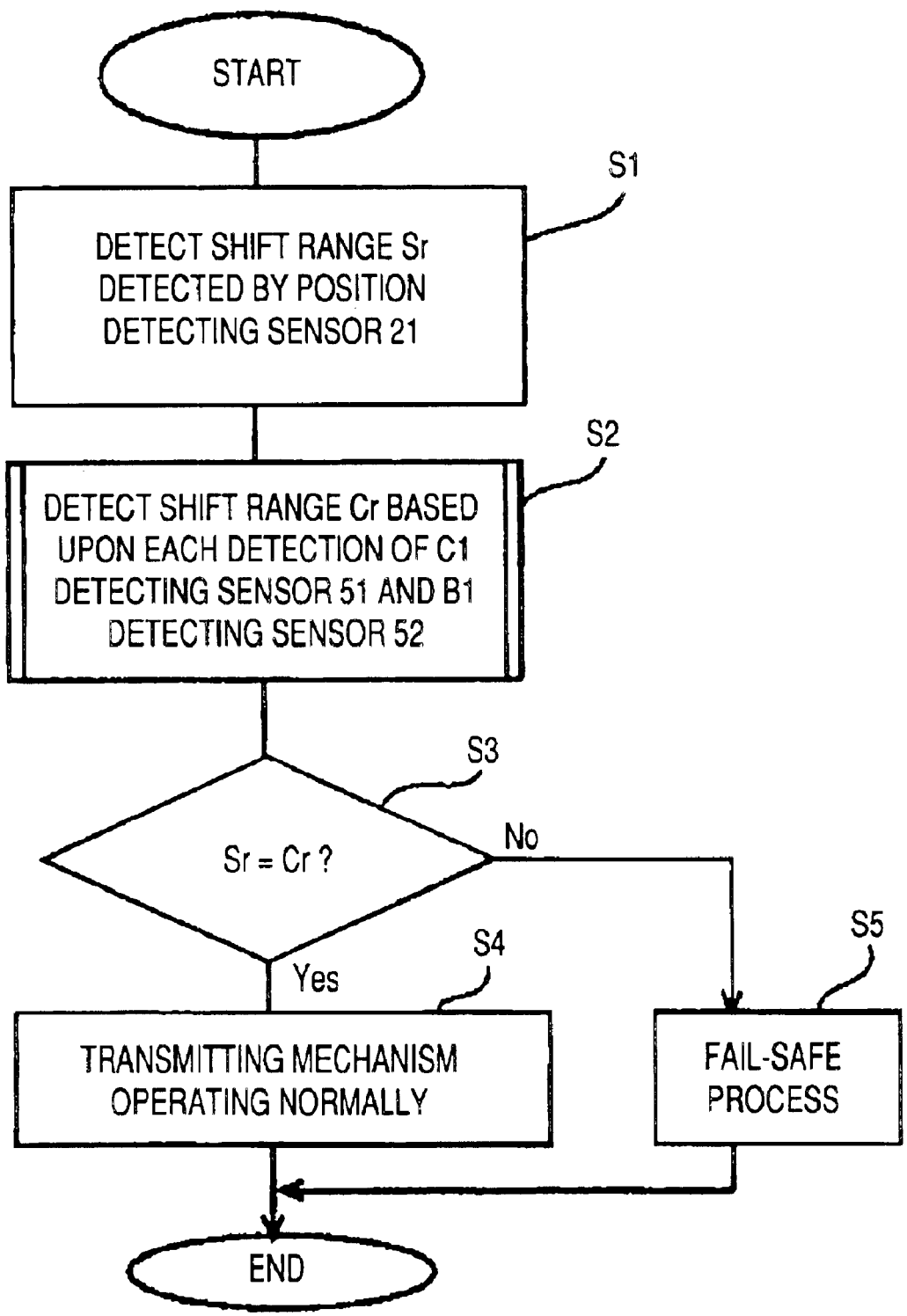
FIG. 6 is a flowchart of a main routine of a control process for controlling operation of the apparatus of the first embodiment.
Figure 7:
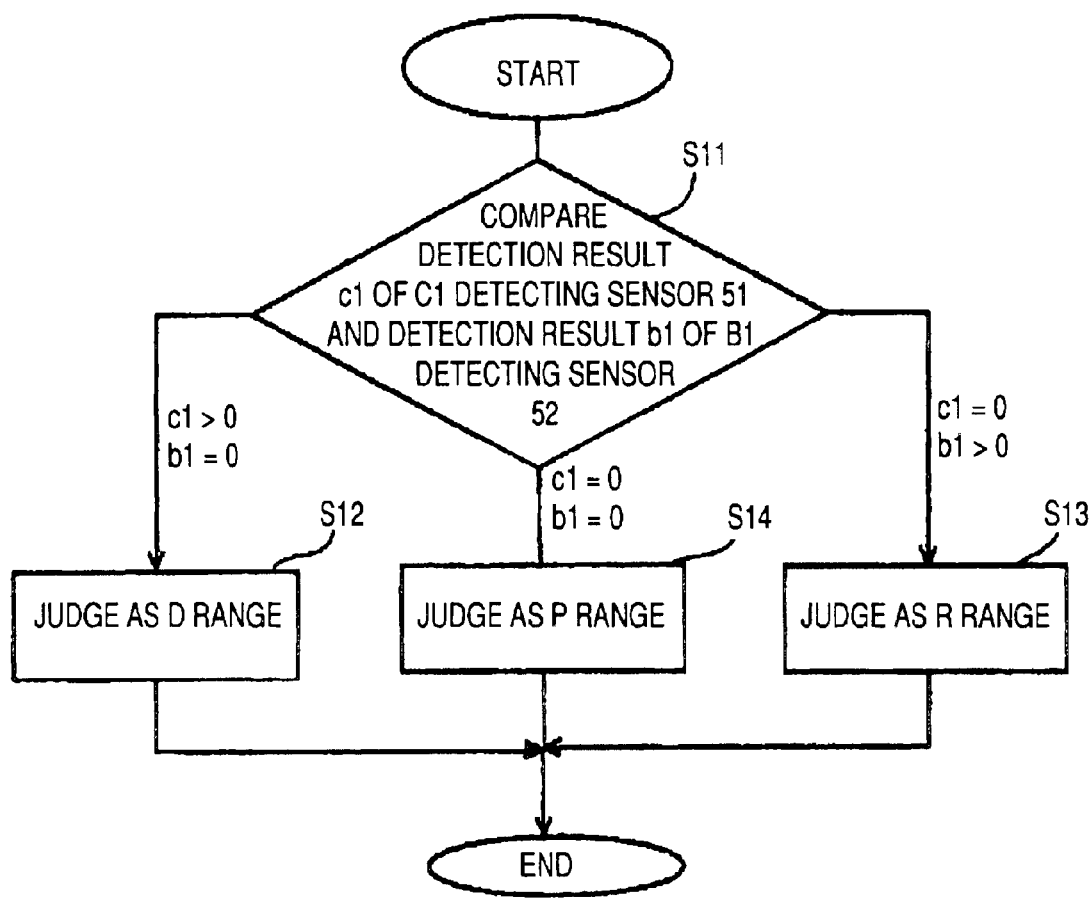
FIG. 7 is a flowchart of a subroutine corresponding to step S2 in FIG. 6.

Next, a fail-safe procedure will be described in connection with the case of operating the shift lever 25 and operating the hydraulic control unit 3 via the shift-by-wire system to change the shift range of the automatic transmission 101 where difficulty may occur. FIG. 6 is a flowchart showing a main control routine for the first embodiment, and FIG. 7 is a flowchart showing a subroutine corresponding to step S2 of the main routine.

First, when the driver moves the shift lever 25 to a desired shift position, the changeover position of the shift lever 25 is detected by the shift lever position detector 23, and a command is output from the shift operation controller 20 to the motor drive controller 19 and the clutch driver controller 22 based upon the detected position of the shift lever 25. In response to this, the motor drive controller 19 starts rotation and drive of the electric motor 12, and the clutch driver controller 22 connects and disconnects the electromagnetic clutch 30 at a predetermined timing to transfer the rotational force of the electric motor 12 to the drive mechanisms on the downward side from the disc 31 at the appropriate time. Thus, as described earlier, the roller 9a of the detent spring 9 is in a free state over the crown portion of the required protrusion of the detent lever 5. Thereafter, it is engaged by insertion into the range engaging groove corresponding to the predetermined range with the rotational momentum from the energized force of the detent spring 9 and the like, thereby enabling change of the shift range according to the driver's operation of the shift lever.

However, when the driver moves the shift lever 25 to a desired shift position, if a failure of the position detecting sensor 21 for detecting the new shift range occurs, or recognition of the position by the sensor 21 becomes difficult due to the effect of noise, temperature, or the like, changing to the desired shift range becomes difficult. Accordingly, it is highly desirable that failures of the position detecting sensor 21 and the like be reliably detected, so that countermeasures can be rapidly and appropriately implemented. For example, if the release position of the roller 9a of the detent spring 9 is slightly early or delayed due to causes such as changes in the amount of rotation of the electric motor 12, because of change in the ambient temperature during travel, or change in timing of connecting and disconnecting by the electromagnetic clutch 30, the roller 9a may be unable to engage within the proper engaging groove, and may mistakenly engage within an adjacent range engaging groove. Such cases may result in the actual new shift range in the automatic transmission 101 being different from the shift range detected with the first detection section 18 based upon the signal of the position detecting sensor 21. Accordingly, even if such a case were to occur, the above fail-safe procedure is executed to execute a shift in a safer direction.

When the shift lever 25 is operated, the new position of the shift lever 25 is detected by the shift lever position detector 23, and commands from the shift operation controller 20 are output to the motor drive controller 19 and the clutch driver controller 22. Thus, the deceleration gear mechanism 46 including the output gear 17, the range control shaft 7, and the like, is operated at the appropriate time by the motor drive controller 19 driving and controlling the electric motor 12, and the clutch drive controller 22 controlling the connecting and disconnecting operation of the electromagnetic clutch 30. At this time, the position detecting sensor 21 detects the operating position of the transmitting mechanism composed of the deceleration gear mechanism 46 and the like, and the first detection section 18 detects a shift range Sr corresponding to the detected operating position (step S1).

Furthermore, by the operation changing the position of the manual valve 2 with the range control shaft 7 and the detent lever 5 rotating through a predetermined angle in a predetermined direction, hydraulic pressure is supplied to each hydraulic servo, including the hydraulic servos C1' and B1', corresponding to the operation within the hydraulic control unit 3. At this time, the C1 detecting sensor 51 and the B1 detecting sensor 52 respectively detect the hydraulic pressure supplied to the hydraulic servo C1' and the hydraulic servo B1', and based on this detection, the second detection section 24 detects a shift range Cr that should be changed to correspond to the operation of the shift lever 25 (step S2).

In step S2, as shown in FIG. 7, the shift range is judged. Namely, the second detection section 24 compares a detection result c1 of the C1 detecting sensor 51 and a detection result b1 of the B1 detecting sensor 52 (step S11). As a result, when the C1 detecting sensor 51 detects hydraulic pressure supplied to the hydraulic servo C1', but the B1 detecting sensor does not detect hydraulic pressure supplied to the hydraulic servo B1', the second detection section 24 judges the shift range to be a forward range such as D or Ds range (step S12). Also, when the C1 detecting sensor 51 does not detect hydraulic pressure supplied to the hydraulic servo C1', but the B1 detecting sensor detects hydraulic pressure supplied to the hydraulic servo B1', the second detection section 24 judges the shift range to be the R range (step S13). Furthermore, when neither the C1 detecting sensor 51 nor the B1 detecting sensor 52 detect supply of hydraulic pressure, the second detection section 24 judges the shift range to be a non-traveling range such as P or N range (step S14).

In step S3, the judging section 29 compares the detection result (Sr) from the first range detection section, consisting of the position detecting sensor 21 and the first detection section 18, the detection result (Cr) of the second range detection section, consisting of the C1 detecting sensor 51 and the B1 detecting sensor 52, and judges whether or not these results are in mutual agreement. As a result, when the judging section 29 judges that the detection results (Sr and Cr) are in agreement, in step S4, the transmitting mechanism, consisting of the electromagnetic clutch 30, the deceleration gear mechanism 46 including the output gear 17, the range control shaft 7, and the like, are recognized as operating normally.

Meanwhile, in step S3, when the detection results (Sr and Cr) are judged not to be in agreement, a failure of the first range detection section is judged, and in step S5, commands to, respectively, the motor drive controller 19, the clutch drive controller 22, and the alarm device 26 are output from the shift operation controller 20 to execute the preset fail-safe procedure so that the vehicle can be changed to a safer state.

In response to the above commands, a controller consisting of the motor drive controller 19, the clutch driver controller 22, and the alarm device 26 executes a procedure to generate an alarm by the sounding of the buzzer 15 and/or the lighting of the lamp 16 while stopping the drive of the electric motor 12 as a fail-safe procedure when the second range detection section detects a traveling range and the speed detection section 27 detects that the traveling speed is equal to or greater than a predetermined value (for example, 7 km/h). Thus, even where shift to a desired shift range during travel encounters difficulty, the driver can bring the vehicle to a stop on the side of the road through braking operation, and take appropriate action thereafter. In this case, the alarm from the buzzer 15 and the lamp 16 may be cancelled when, for example, the shift lever 25 is returned to the neutral position (N).

Alternatively, in cases where the judging section 29 judges that the detection results are not in agreement, when the second range detection section detects a traveling range and the speed detection section 27 detects that the traveling speed is less than the predetermined value (for example, 7 km/h), the controller, as a fail-safe procedure, can drive the electric motor 12 in one direction, i.e. rotate the detect lever 5 in a direction toward arrow D in FIG. 1 for a predetermined amount of time or longer, and execute the program to change the traveling range to the P range, which corresponds to rotation to the maximum extent in the arrow D direction. In this case, the detent lever 5 is rotated for a predetermined amount of time or longer (or to a predetermined extent) by the electric motor 12 and, therefore, even if the roller 9a of the detent spring 9 is engaged within any one of the range engaging grooves 5e, 5f, 5g, and 5h, the roller 9a will be moved therefrom to become reliably engaged within the range engaging groove 5d corresponding to the P range. Thus, even when changing to a desired shift range encounters difficulty, the shift range can be reliably and automatically changed to the P range during stopping, thereby shifting to a safer state.

The predetermined time mentioned above is set to be sufficient to allow the roller 9a to reach the range engaging groove 5d even when within the range engaging groove 5h which is the groove farthest from the range engaging groove 5d corresponding to the P range (see FIG. 3). In rotation of the range control shaft 7, and accordingly, the detent lever 5 in the direction of arrow D, it is preferable that the detent lever 5 to be structured so that it can idle while the predetermined time passes after engagement, by insertion of the roller 9a into the range engaging groove, is completed, even when the roller 9a is positioned within a range engaging groove other than the range engaging groove 5h that is close to the range engaging groove 5d.

Alternatively, in cases where the judging section 29 judges that the results of detection are not in agreement, when the second range detection section detects a traveling range and the speed detection section 27 detects that the traveling speed is less than the predetermined value (for example, 7 km/h), the controller executes a fail-safe procedure whereby an alarm is generated by the sounding of the buzzer 15 and/or the lighting of the lamp 16 while stopping the drive of the electric motor 12. In this case, even when changing to a desired shift range presents a problem during stopping, etc., the driver is immediately notified of that situation. In this case as well, an alarm from the buzzer 15 and/or the lamp 16 can be cancelled when, for example, the shift lever 25 is returned to the neutral position (N).

As described above, with the range shift mechanism 1 of this first embodiment, the fail-safe procedure is executed when the shift range intentionally selected by the driver with operation of the shift lever 25, in other words, the detected result of the shift range Sr corresponding to the operating position of the output gear 17 of the deceleration gear mechanism 46 and the like, is not in agreement with the shift range Cr to which the automatic transmission 101 is actually shifted. Therefore, even if the shift range of the automatic transmission 101 does not change to the desired range, the problem can be resolved by shifting to a safer state.

Second Embodiment

Figure 8:
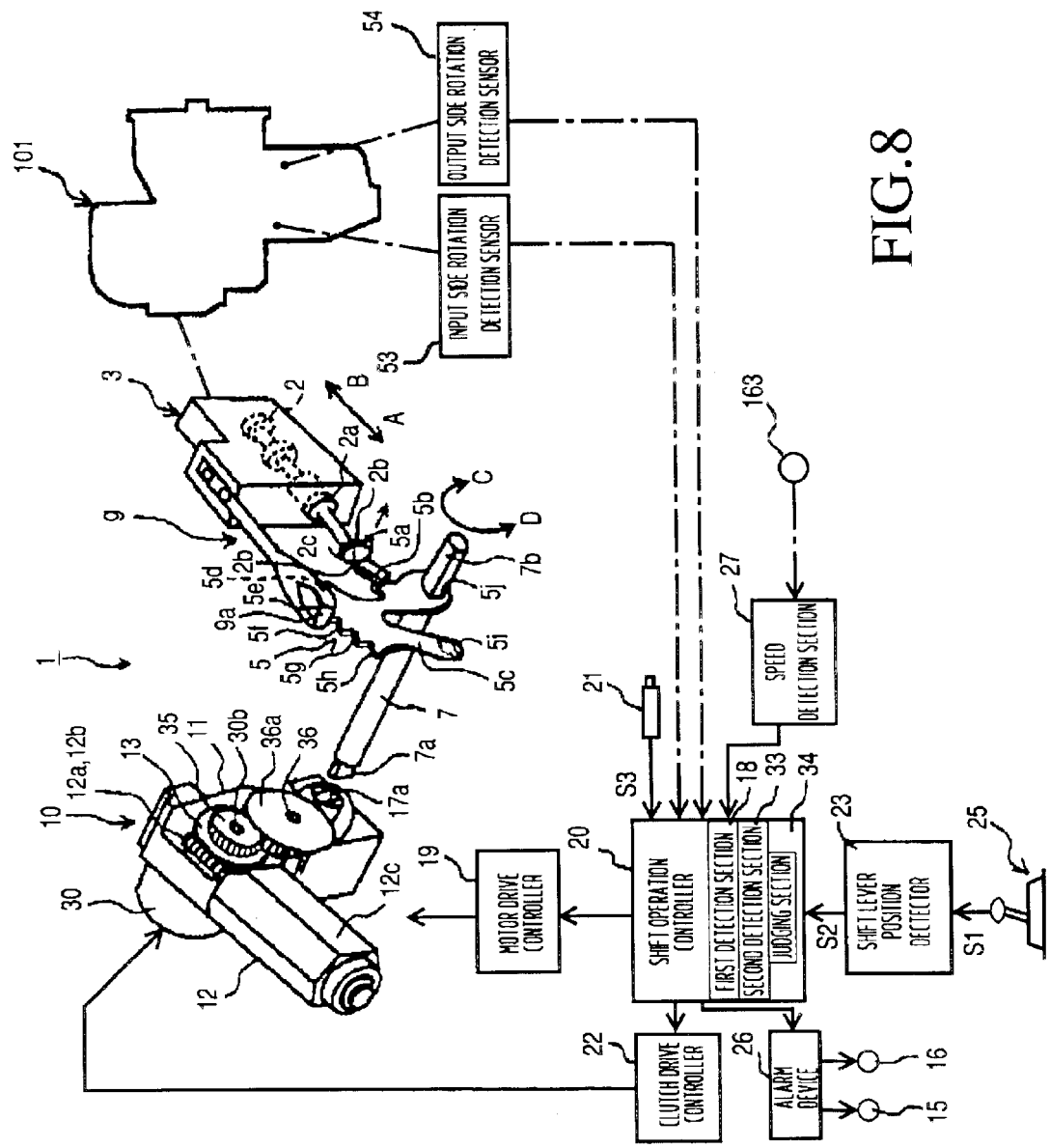
FIG. 8 is a perspective view of a range shift mechanism of a second embodiment according to the present invention.

A second embodiment of the present invention will now be described with reference to FIG. 8. As shown in FIG. 8, the second embodiment has an input side rotation sensor 53 and an output side rotation sensor 54 in place of the detecting sensors 52 and 52 of the first embodiment (FIG. 1), a third detection section 33 in place of the second detection section 24, and a judging section 34 in place of the judging section 29. Accordingly, the description which follows will focus on these differences.

The range shift mechanism 1 according to this second embodiment has the input side rotation sensor 53 positioned to detect the rotation of the input shaft 112 (see FIG. 4), and the output side rotation sensor 54 positioned to detect the rotation of the right and left axles 60 and 61 (see FIG. 4). Furthermore, the range shift mechanism 1 has a third detection section 33 and a judging section 34, which detect the shift range of the automatic transmission 101 newly established by the range operating mechanism described earlier, based upon the detection signals received by the shift operation controller 20 from the first detection section 18, having a function identical to that in the first embodiment, the input side rotation sensor 53, and the output side rotation sensor 54. In this second embodiment, the first range detection section includes the position detecting sensor 21 and the first detection section 18, identical to the first embodiment. However, the second range detection section is different from that of the first embodiment in that it includes the detection sensors 53 and 54, and the third detection section 33. In addition, the judging section 34 judges whether the results of detection of the first and second range detection sections are in mutual agreement, and the failure judging section judges a failure of the first range detection section if it is determined that the detection results are not in agreement.

Figure 9:
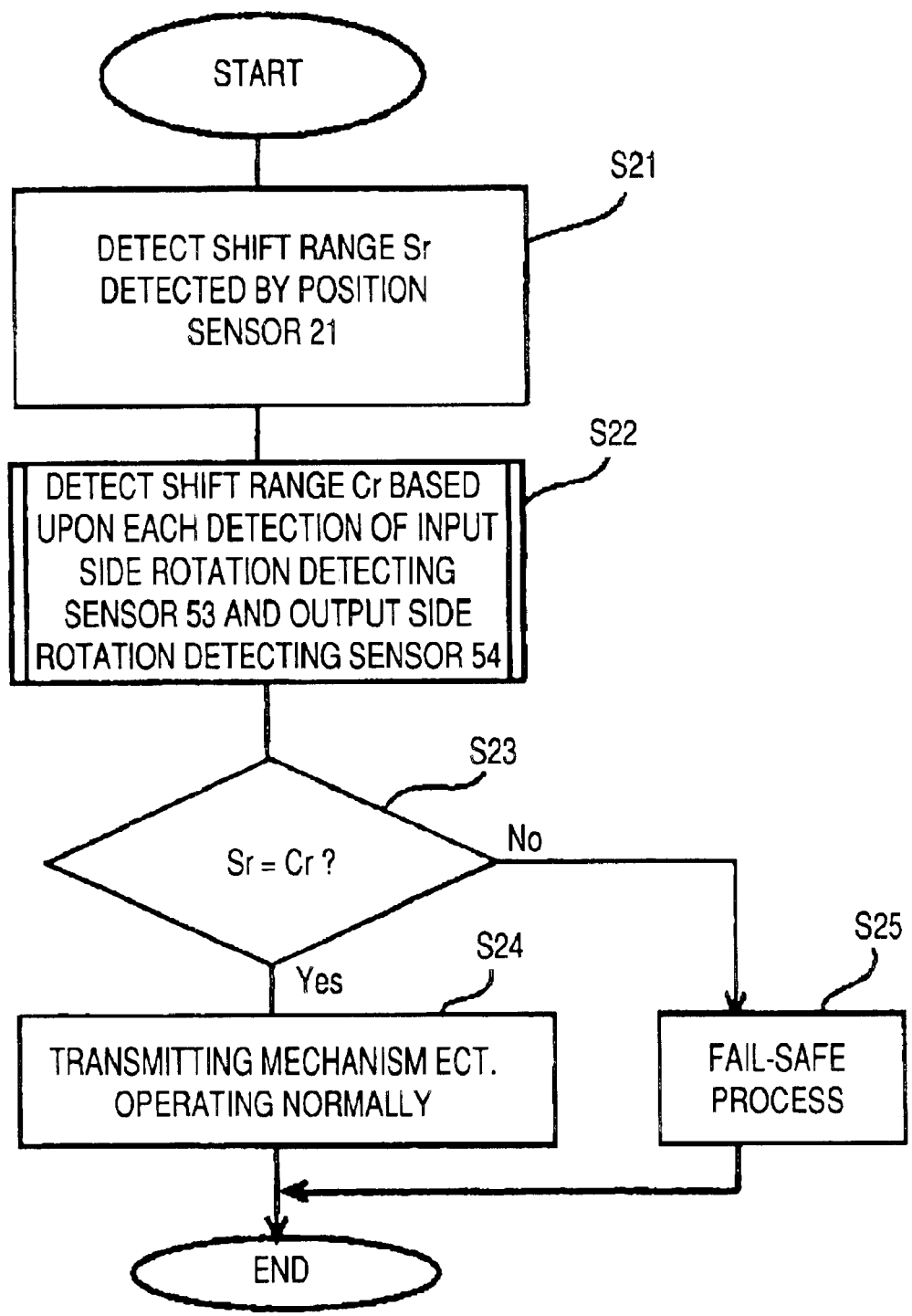
FIG. 9 is a flowchart showing a main routine of a control process for controlling operation of the apparatus of the second embodiment.
Figure 10:
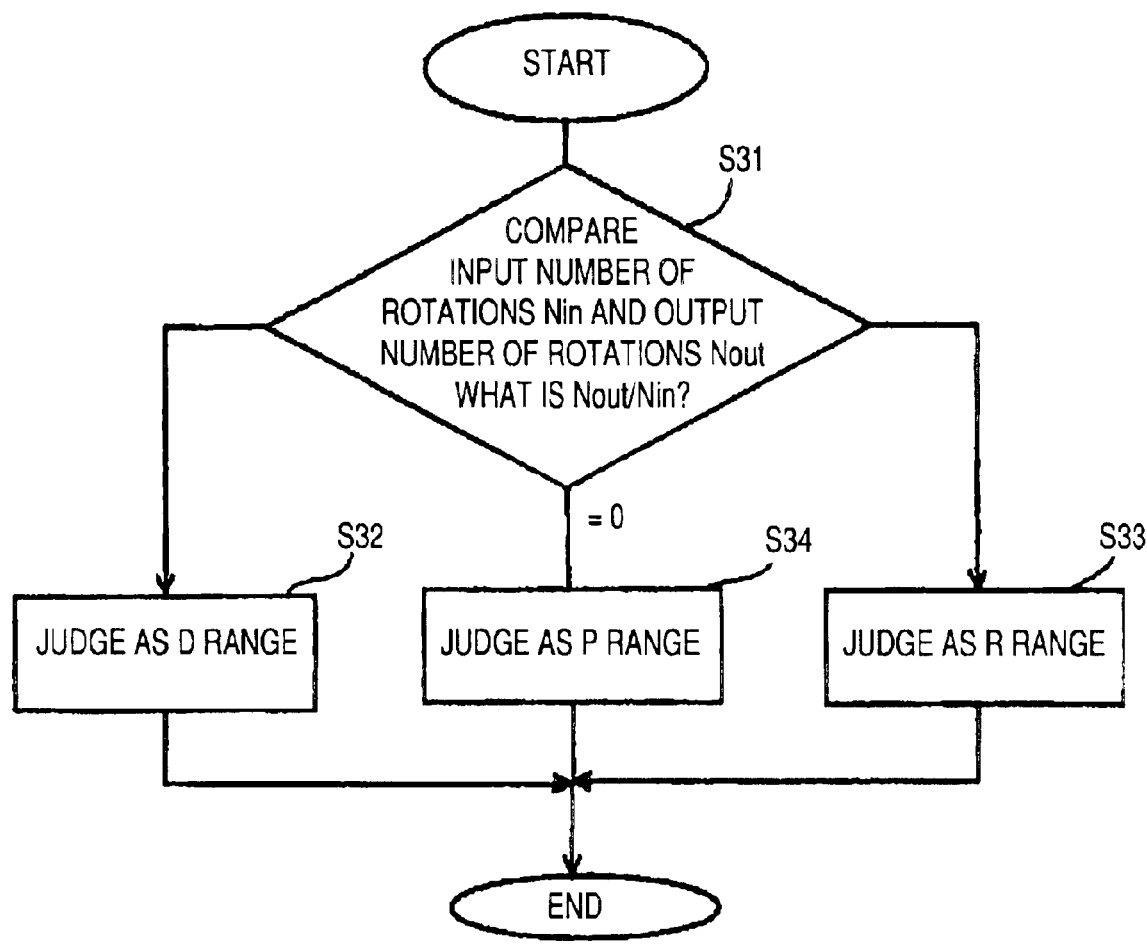
FIG. 10 is a flowchart of a subroutine corresponding to step S22 in FIG. 9.

In the second embodiment, the fail-safe routine for the case where shifting (change over) to a desired range is as illustrated by the flowchart of FIG. 9 and the flowchart of FIG. 10 shows a subroutine corresponding to step S22 of the main routine of FIG. 9.

When the shift lever 25 is moved and the new position of the lever 25 is detected by the shift lever position detector 23, the shift operation controller 20 outputs appropriate commands to the motor drive controller 19 and the clutch drive-controller 22. Thus, the motor drive controller 19 controls the drive of the electric motor 12, and the clutch drive controller 22 controls the engaging/disengaging operations of the electromagnetic clutch 30. Therefore, the transmitting mechanism which includes the deceleration gear mechanism 46, is operated, and the position detecting sensor 21 detects the operating position of the output gear 17 and sends the detection signal to the first detection section 18. Hence, the first detection section 18 detects the shift range Sr corresponding to the operating position of the transmitting mechanism based upon the detection signal (step S21).

The manual valve 2 is operated by the rotation of the detent lever 5, and the hydraulic control unit 3 changes the shift range in a manner corresponding to the repositioning of the shift lever 25. At this time, the input side rotation detecting sensor 53 detects the rotation of the input shaft 112, the output side rotation detecting sensor 54 detects the rotation of the right and left axles 160 and 161, and based upon the detected values for rotation, the third detection section 33 determines if the shift range Cr newly established by the shift operation corresponds to the operation of the shift lever 25 (step S22).

As shown in FIG. 10, in step S22, the shift range is judged. More specifically, the third detection section 33 compares the detected number of rotations Nout from the output side rotation detecting sensor 54 and the detected number of rotations Nin from the input side rotation detecting sensor 53, and calculates a ratio Nout/Nin (step S31). When the ratio Nout/Nin is greater than 0, the third detection section 33 judges that the shift range is a forward range such as D or Ds range (step S32), and judges that the shift range is a reverse range (R range) when the ratio Nout/Nin is less than 0. Furthermore, the third detection section judges that the shift range is a non-traveling range such as P or N range when the ratio Nout/Nin is 0.

In step S23, the judging section 34 compares the range (Sr) detected by the first range detection section, consisting of the first detection section 18 and the position detecting sensor 21, and the range (Cr) detected by second range detection section consisting of the third detection section 33, the input side rotation detecting sensor 53 and the output side rotation detecting sensor 54, and judges whether these ranges are in agreement. As a result, when it judged that the detected ranges (Sr and Cr) are in agreement, the judging section 34 recognizes in step S24 that the transmitting mechanism consisting of the electromagnetic clutch 30, and the deceleration gear mechanism 46, and the like is operating normally. On the other hand, when it is judged that the detected ranges (Sr and Cr) are not in agreement in step S23, failure of the first range detection section is judged, and in step S25, in order to execute the preset fail-safe procedure such that the vehicle can be shifted to a safer state, the shift operation controller 20 outputs commands to, respectively, the motor drive controller 19, the clutch driver controller 22, and the alarm mechanism 26. In response to these commands, the controller consisting of the motor drive controller 19, the clutch driver controller 22 and the alarm mechanism 26, executes the fail-safe procedure identical to that in the first embodiment.

The fail-safe procedures of the first and second embodiments are not limited to those described above. In short, any procedure other than described above can be identically applied so long as it is a provides for a shift to a safer state.

As described above, according to the first and second embodiments of the present invention, when the range detected by the first detection section, i.e., the shift range corresponding to the position of the deceleration gear mechanism 46, and the range detected by the second range detection section, i.e., the actual newly established shift range, are not in mutual agreement, the judging sections 29 and 34 operate as a failure judging section to judge a failure of the first range detection section. Therefore, it is possible to rapidly and appropriately execute countermeasures when a failure occurs by reliably detecting a failure of the position detecting sensor 21.

In addition, the shift range to which the automatic transmission. 101 is actually shifted can be reliably determined simply by detecting the presence of hydraulic pressure supplied to the first and second hydraulic servos C1' and B1' with the C1 detecting sensor 51 and the B1 detecting sensor 52, and judging the results of detection with the judging section (24 and 33). Therefore, the necessary structure for range detection is simplified by the present invention. Furthermore, the shift range to which the automatic transmission 101 is actually shifted can be reliably detected simply by calculating the ratio of the number of rotations of an output side rotation element, such as right and left axles, to the number of rotations of an input side rotation element, such as an input shaft, and judging the ratio with the range judging section (24 and 33), thus further simplifying the structure for range detection.

In addition, when the shift range detected by the first range detection section, corresponding to the operating position of the transmitting mechanism such as the range control shaft 7, the electromagnetic clutch 30, and the deceleration gear mechanism 46, and the actual shift range detected by the second range detection section are not in agreement, that is, when the shift range could not be changed over to the shift range selected by the driver, a shift to a safer state is executed by the motor drive controller 19, the shift operation controller 20, the clutch driver controller 22, and the alarm device 26, executing the preset fail-safe procedure.

When the ranges detected by the first and second range detection sections are not in mutual agreement and a failure of the first range detection section is judged, if the vehicle traveling speed is equal to or greater than the predetermined value, an alarm is generated by the sounding of the buzzer 15 or the lighting of the lamp 16 while stopping the drive of the drive mechanism, such as the electric motor 12, as a fail-safe procedure. Therefore, even when changing to the selected shift range encounters difficulty during travel, the driver can be immediately notified of that situation. Thus, the driver immediately recognizes the situation and can take appropriate action.

Also, in the case where the shift ranges detected by the first and second range detection sections are not in mutual agreement and a failure of the first range detection section is judged, if the vehicle traveling speed is less than the predetermined value, the drive mechanism such as the electric motor 12 is designed to be driven in one direction for a predetermined amount of time or longer such that the current shift range is changed to the P range as a fail-safe procedure. Therefore, even when changing to a desired shift range encounters difficulty, the shift range can be reliably and automatically changed to the P range in stopping, thereby effecting a shift to a safer state.

Furthermore, in the case where the ranges detected by the first and second range detection sections are not in mutual agreement and a failure of the first range detection section is judged, if the vehicle traveling speed is less than the predetermined value, an alarm is generated by the sounding of the buzzer 15 and/or the lighting of the lamp 16 while stopping the drive of a drive mechanism such as the electric motor 12. Therefore, in this manner also, when changing to a selected shift range encounters difficulty during stopping, the driver can immediately recognize that situation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle range shift mechanism comprising:
   a range selecting mechanism for selecting a shift range;
   a drive mechanism that is interlocked with and drives the range selecting mechanism;
   a range operating mechanism for operating a changeover valve with the driving force of the drive mechanism to change the shift range of an automatic transmission;
   a transmitting mechanism for transmitting driving force of the drive mechanism to the range operating mechanism;
   a first range detection section that detects a shift range corresponding to an operating position of the transmitting mechanism;
   a second range detection section that detects an actual shift range as changed by the range operating mechanism;
   a judging section that judges whether or not the shift ranges detected by the first and second range detection sections are in mutual agreement;
   a failure judging section that judges a failure of the first range detection section when the detected ranges are judged by the judging section as not in mutual agreement;
   a controller that executes a preset fail-safe procedure when the failure judging section judges a failure; and
   a speed detecting sensor that detects a vehicle traveling speed, and wherein the controller generates an alarm and stops the drive mechanism as a fail-safe procedure, responsive to judgement of failure by the failure judging section, detection of a traveling range by the second range detection section, and detection of a traveling speed equal to or greater than a predetermined value by the speed detecting sensor.

2. The vehicle range shift mechanism according to claim 1, wherein the controller changes the traveling range to a parking range with the range operating mechanism by driving the drive mechanism in one direction for a predetermined amount of time or longer as a fail-safe procedure in a case where the failure judging section judges a failure when the second range detection section detects the traveling range and the speed detecting sensor detects the traveling speed that is less than the predetermined value.

3. The vehicle range shift mechanism according to claim 1, wherein the controller generates an alarm while stopping the drive mechanism as a fail-safe procedure responsive to judgement of a failure by the failure judging section when the second range detecting sensor detects the traveling range and the speed detection section detects the traveling speed that is less than the predetermined value.

4. The vehicle range shift mechanism according to claim 1,
   wherein the automatic transmission is provided with first and second friction engaging elements that respectively correspond to a forward range and a reverse range, and first and second hydraulic servos that respectively operate the first and second friction engaging elements;
   wherein the second range detection section is provided with first and second hydraulic pressure detecting sensors that respectively detect the presence of hydraulic pressure supplied to the first and second hydraulic servos, and a range judging section that judges the shift range of the automatic transmission based upon input from both hydraulic pressure detecting sensors, and
   wherein the range judging section judges the shift range as a forward range when the first hydraulic pressure detecting sensor detects hydraulic pressure supplied to the first hydraulic servo and the second hydraulic pressure detecting sensor detects hydraulic pressure supplied to the second hydraulic servo, judges the shift range as a reverse range when the first hydraulic pressure detecting sensor does not detect the supply of hydraulic pressure to the first hydraulic servo and the second hydraulic pressure detecting sensor detects the supply of hydraulic pressure to the second hydraulic servo, and judges the shift range as a non-traveling range when neither of the hydraulic pressure detecting sensors detects a supply of hydraulic pressure.

5. The vehicle range shift mechanism according to claim 2, wherein the controller changes the traveling range to a parking range with the range operating mechanism by driving the drive mechanism in one direction for a predetermined amount of time or longer as a fail-safe procedure in a case where the failure judging section judges a failure when the second range detection section detects the traveling range and the speed detecting sensor detects the traveling speed that is less than the predetermined value.

6. The vehicle range shift mechanism according to claim 2, wherein the controller generates an alarm while stopping the drive mechanism as a fail-safe procedure responsive to judgement of a failure by the failure section when the second range detecting sensor detects the traveling range and the speed detection section detects the traveling speed that is less than the predetermined value.

7. The vehicle range shift mechanism according to claim 1,
   wherein the second range detection section is provided with first and second rotation detecting sensors that respectively detect the number of rotations of a rotating element on an input side and a rotating element on an output side of the automatic transmission, and a range judging section that judges shift range of the automatic transmission based upon inputs from both the rotation detecting sensors, and
   wherein the range judging section compares the number of rotations detected by the second rotation detecting sensor and the number of rotations detected by the first rotation detecting sensor and calculates a ratio thereof, judges the shift range to be a forward range when the ratio is greater than 0, judges the shift range to be a reverse range when the ratio is less than 0, and judges the shift range to be a non-traveling range when the ratio is 0.

8. The vehicle range shift mechanism according to claim 3, wherein the controller changes the traveling range to a parking range with the range operating mechanism by driving the drive mechanism in one direction for a predetermined amount of time or longer as a fail-safe procedure in a case where the failure judging section judges a failure when the second range detection section detects the traveling range and the speed detecting sensor detects the traveling speed that is less than the predetermined value.

9. The vehicle range shift mechanism according to claim 3, wherein the controller generates an alarm while stopping the drive mechanism as a fail-safe procedure responsive to judgement of a failure by the failure judging section when the second range detecting sensor detects the traveling range and the speed detection section detects the traveling speed that is less than the predetermined value.

* * * * *